(12) United States Patent
Liu et al.

(10) Patent No.: US 12,411,954 B2
(45) Date of Patent: Sep. 9, 2025

(54) COMPUTING DEVICE CONFIGURATION MODIFICATION PREVENTION SYSTEM

(71) Applicant: Dell Products L.P., Round Rock, TX (US)

(72) Inventors: Wei Liu, Austin, TX (US); Po-Yu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 18/509,881

(22) Filed: Nov. 15, 2023

(65) Prior Publication Data

US 2025/0156548 A1    May 15, 2025

(51) Int. Cl.
*G06F 21/57*    (2013.01)
*G06F 21/86*    (2013.01)

(52) U.S. Cl.
CPC ............ *G06F 21/572* (2013.01); *G06F 21/86* (2013.01)

(58) Field of Classification Search
None
See application file for complete search history.

(56) References Cited

U.S. PATENT DOCUMENTS

| | | | | |
|---|---|---|---|---|
| 6,633,981 B1 * | 10/2003 | Davis | ...................... | G06F 21/57 713/185 |
| 2014/0283018 A1 * | 9/2014 | Dadu | ...................... | G06F 21/70 726/19 |

OTHER PUBLICATIONS

Kim Kinahan et al., "iDRAC9 System Lockdown: Preventing Unintended Server Changes," DELL Technologies Server and Infrastructure Engineering, Direct from Development, Jan. 13, 2023, 2 pages https://infohub.delltechnologies.com/p/idrac9-system-lockdown-preventing-unintended-server-changes/.

* cited by examiner

*Primary Examiner* — Brandon Hoffman
(74) *Attorney, Agent, or Firm* — Joseph Mencher

(57) ABSTRACT

A computing device configuration modification prevention system includes a chassis that houses a BIOS storage subsystem that stores a BIOS authentication information and BIOS settings, a BIOS settings modification subsystem and a BIOS authentication modification subsystem, and a BIOS lockdown subsystem that is coupled to the BIOS storage subsystem, the BIOS settings modification subsystem, and the BIOS authentication modification subsystem. The BIOS lockdown subsystem determines that a BIOS lockdown mode is set and configures the BIOS storage subsystem to prevent modification of the BIOS settings. The BIOS lockdown subsystem then executes first BIOS instructions to provide a BIOS while ignoring a subset of the first BIOS instructions to access the BIOS settings modification subsystem, and executes second BIOS instructions to provide the BIOS while ignoring a subset of the second BIOS instructions to access the BIOS authentication modification subsystem.

20 Claims, 16 Drawing Sheets

COMPUTING DEVICE CONFIGURATION MODIFICATION PREVENTION SYSTEM

BACKGROUND

The present disclosure relates generally to information handling systems, and more particularly to preventing modifications to the configuration of an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art may be deployed in locations that present security challenges relative to traditional datacenter locations. For example, edge computing locations and/or other remote locations where computing devices process data at the "edge" of a network may be associated with reduced or unknown security, may allow for unauthorized physical access to the computing devices, and/or may present other security issues known in the art. As will be appreciated by one of skill in the art in possession of the present disclosure, the unauthorized physical access discussed above may allow the disabling of security protections enabled on computing devices.

For example, one security measure used to protect computing devices is the enabling of a BIOS setup password that requires a user to authenticate using security credentials before that user may access the BIOS. However, a user with physical access to the computing device can disable that BIOS setup password by removing a password enable ("PWD_EN") jumper (e.g., on the motherboard in the computing device). Furthermore, a user with physical access to the computing device can also install a Non-Volatile Random Access Memory Clear (NVRAM_CLR) jumper (e.g., on the motherboard in the computing device) to clear configurations stored in the NVRAM, or remove a Complementary Metal Oxide Semiconductor (CMOS) battery, either of which may allow the reset of configurations that have been provided for the computing device to a default setting.

One conventional solution to such issues is to enable a configuration lockdown mode for the computing device via a Baseboard Management Controller (BMC) (e.g., an integrated DELL® Remote Access Controller (iDRAC) available in computing devices provided by DELL® Inc. of Round Rock, Texas, United States), which one of skill in the art will recognize prevents local users from modifying BIOS settings and BMC settings. However, such conventional configuration lockdown modes are dependent on BMC Intelligent Platform Management Interface (IPMI) commands, and can be circumvented by resetting the BMC (e.g., via the use of a jumper in the BMC similarly as described above) to prevent the BMC from utilizing BMC IPMI commands to communicate with the BIOS.

Accordingly, it would be desirable to provide a computing device security system that addresses the issues discussed above.

SUMMARY

According to one embodiment, an Information Handling System (IHS) includes a BIOS processing system; and a BIOS memory system that is coupled to the BIOS processing system and that includes instructions that, when executed by the BIOS processing system, cause the BIOS processing system to provide a BIOS lockdown engine that is configured to: determine that a BIOS lockdown mode is set; configure, in response to determining that the BIOS lockdown mode is set, a BIOS storage subsystem that is coupled to the BIOS processing system to prevent modification of BIOS settings stored in the BIOS storage subsystem; execute first BIOS instructions to provide a BIOS and, in response to determining that the BIOS lockdown mode is set, ignore a subset of the first BIOS instructions to access a BIOS settings modification subsystem that is coupled to the BIOS processing system; and execute second BIOS instructions to provide the BIOS and, in response to determining that the BIOS lockdown mode is set, ignore a subset of the second BIOS instructions to access a BIOS authentication modification subsystem that is coupled to the BIOS processing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
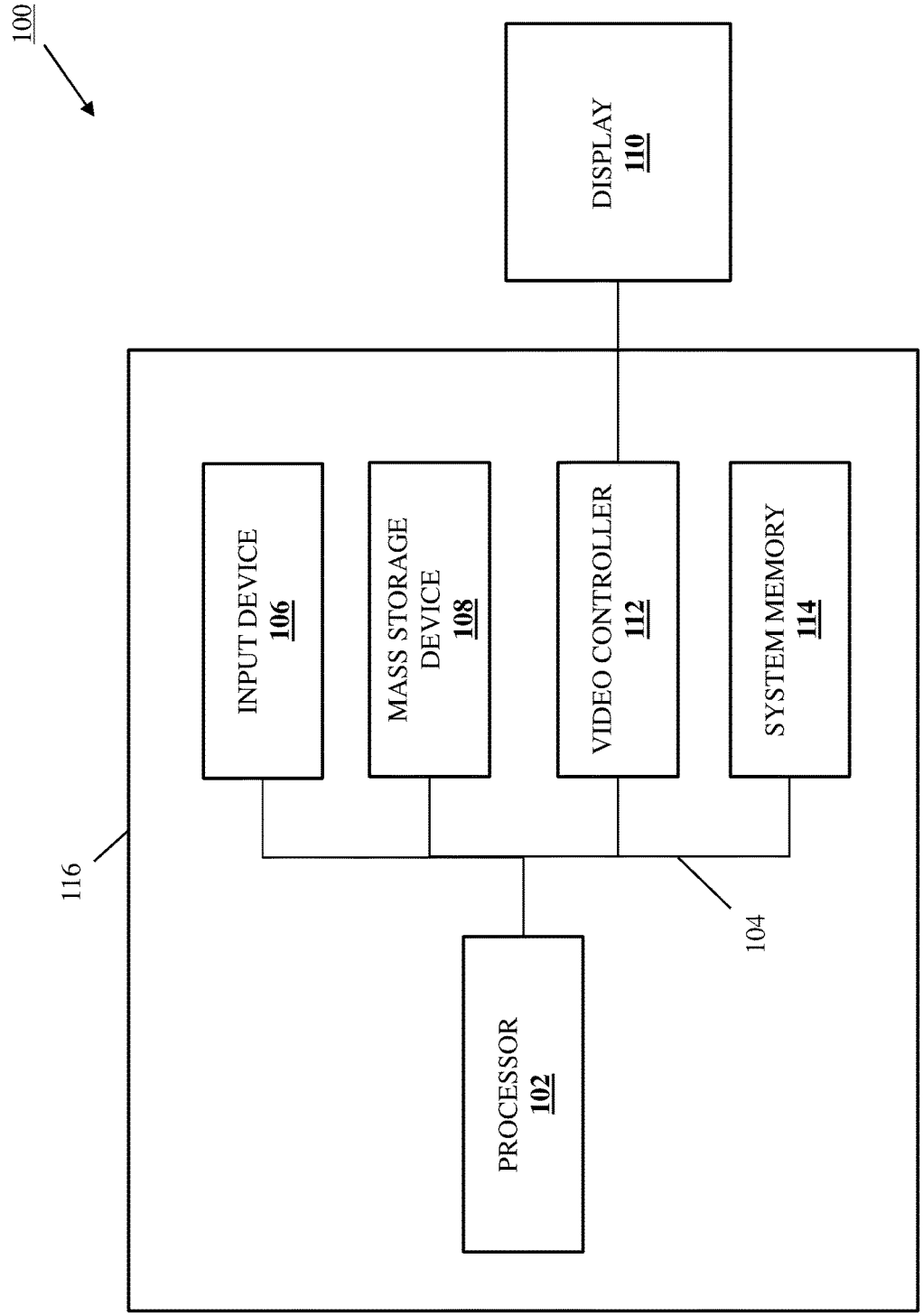
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
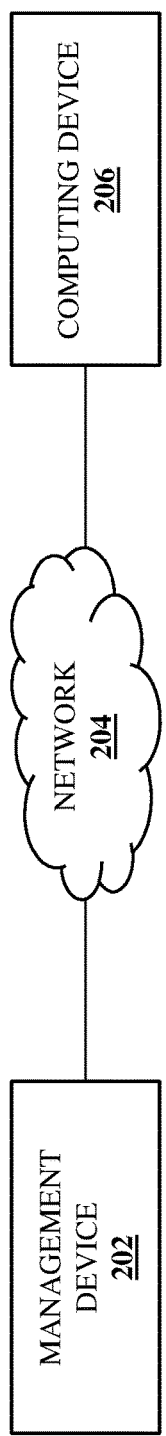
FIG. 2 is a schematic view illustrating an embodiment of a networked system that may include the computing device configuration modification prevention system of the present disclosure.

Referring now to FIG. 2, an embodiment of a networked system 200 is illustrated that may include the computing device configuration modification prevention system of the present disclosure. In the illustrated embodiment, the networked system 200 includes a management device 202. In an embodiment, the management device 202 may be provided by the IHS 100 discussed above with reference to FIG. 1, and/or may include some or all of the components of the IHS 100. In a specific example, the management device 202 may be provided by desktop computing devices, laptop/notebook computing devices, tablet computing devices, mobile phones and/or other management devices that would be apparent to one of skill in the art in possession of the present disclosure. However, while illustrated and discussed as being provided by particular devices, one of skill in the art in possession of the present disclosure will recognize that management devices provided in the computing device configuration modification prevention system of the present disclosure may include other devices that may be configured to operate similarly as the management device 202 discussed below.

In the illustrated embodiment, the management device 202 is coupled to a network 204 that may be provided by a Local Area Network (LAN), the Internet, combinations thereof, and/or any other network that would be apparent to one of skill in the art in possession of the present disclosure. Furthermore, a computing device 206 that may provide the computing device configuration modification prevention system of the present disclosure is coupled to the management device 202 via the network 204. In an embodiment, the computing device 206 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that computing devices provided in the networked system 200 may include any devices that may be configured to operate similarly as the computing device 206 discussed below. Furthermore, while a specific networked system 200 has been illustrated and described, one of skill in the art in possession of the present disclosure will recognize that the networked system 200 of the present disclosure may include a variety of components and component configurations while remaining within the scope of the present disclosure as well.

Figure 3:
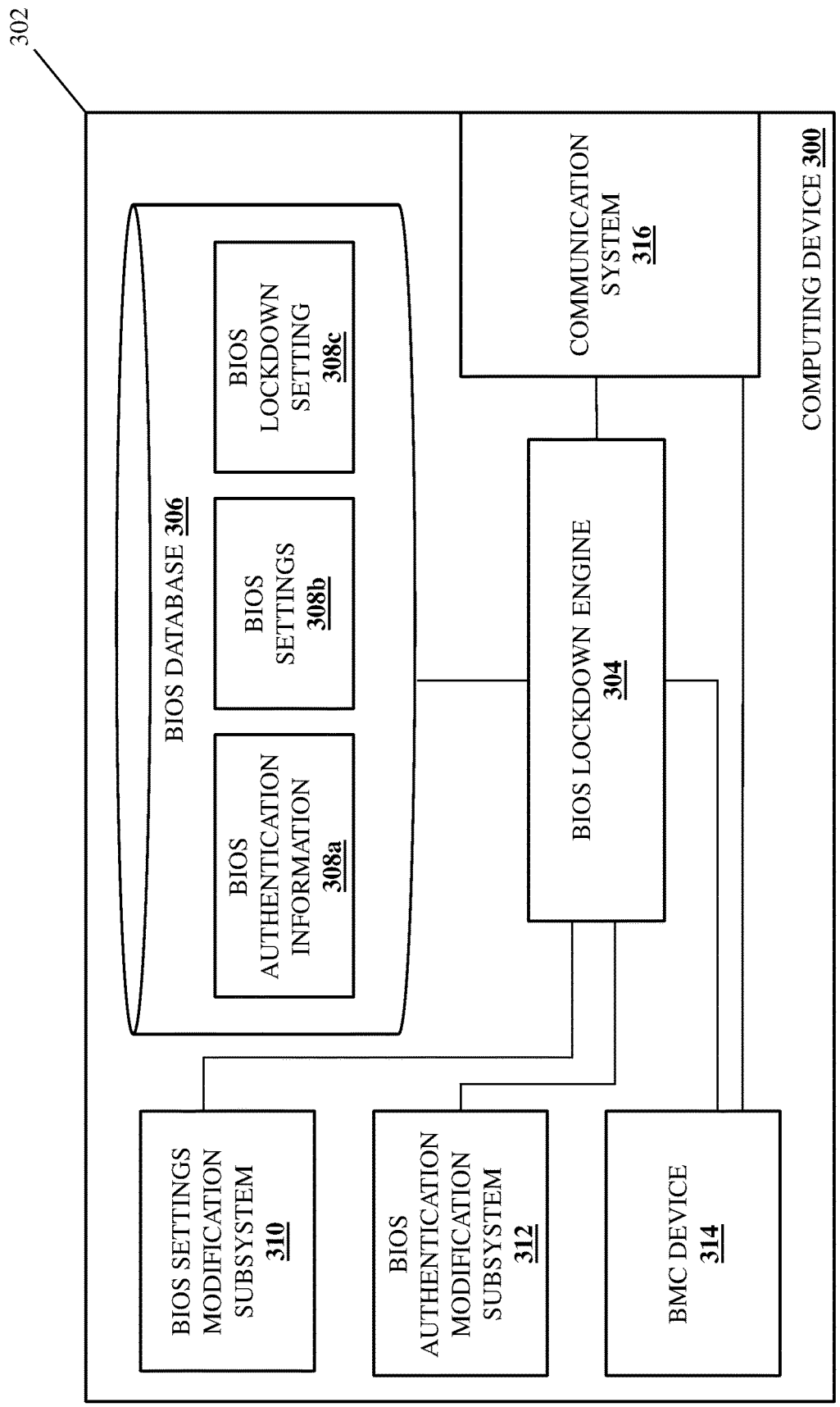
FIG. 3 is a schematic view illustrating an embodiment of a computing device that may provide the computing device configuration modification prevention system of the present disclosure.

Referring now to FIG. 3, an embodiment of a computing device 300 is illustrated that may provide the computing device 206 discussed above with reference to FIG. 2. As such, the computing device 300 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated and discussed below.

For example, the chassis 302 may house a processing system (not illustrated, but which may include the processor 102 discussed above with reference to FIG. 1 such as a Central Processing Unit (CPU)) and a memory system (not illustrated, but which may include the memory 114 discussed above with reference to FIG. 1 such as, for example, Dynamic Random Access Memory (DRAM)) that is coupled to the processing system and that includes instructions that, when executed by the processing system, cause the processing system to provide a Basic Input/Output System (BIOS) lockdown engine 304 that is configured to perform the functionality of the BIOS lockdown engines, the BIOS lockdown subsystems, and/or computing devices discussed below. However, while illustrated and described below as a "BIOS" lockdown engine that operates to lockdown a BIOS that is configured to perform hardware initialization during an initialization process for the computing device 300, runtime services for an operating system and/or application/programs provided by the computing device 300, and/or other BIOS operations that would be apparent to one of skill in the art in possession of the present disclosure, one of skill in the art in possession of the present disclosure will appreciate how the BIOS lockdown engine 304 may be provided by a Unified Extensible Firmware Interface (UEFI) lockdown engine that operates to lockdown a UEFI provided to according to the UEFI specification that defines an architecture of platform firmware used to initialize (e.g., boot) hardware in the computing device 300, as well as its interface for interaction with an operating system in the computing device 300, while remaining within the scope of the present disclosure as well.

The chassis 302 may also house a storage system (not illustrated, but which may include the storage 108 discussed above with reference to FIG. 1) that is coupled to the BIOS lockdown engine 304 (e.g., via a coupling between the storage system and the processing system) and that includes a BIOS database 306 that is configured to store any of the information utilized by the BIOS lockdown engine 304 discussed below. For example, in the illustrated embodiment, the BIOS database 306 stores BIOS authentication information 308a that may include a username and password, biometric information, and/or any other authentication information that would be apparent to one of skill in the art in possession of the present disclosure. Furthermore, in the illustrated embodiment, the BIOS database 306 also stores BIOS settings 308b that may include BIOS setup options, BIOS attributes, system configurations, security settings (e.g., Secure Boot enable/disable settings, Trusted Platform Module (TPM) enable/disable settings, etc.), and/or other BIOS settings that would be apparent to one of skill in the art in possession of the present disclosure. Furthermore, in the illustrated embodiment, the BIOS database 306 also stores a BIOS lockdown setting 308c that one of skill in the art in possession of the present disclosure will recognize may include any hardware and/or software data structure that allows or enables the BIOS lockdown mode described below. However, while a variety of different BIOS database information has been described, one of skill in the art in possession of the present disclosure will appreciate how the BIOS database 306 may store other information while remaining within the scope of the present disclosure as well.

As illustrated, the chassis 302 also houses a BIOS settings modification subsystem 310 that is coupled to the BIOS lockdown engine 304 (e.g., via a coupling between the BIOS setting modification subsystem 310 and the processing system). In specific example, the BIOS settings modification subsystem 310 may be provided by a physical jumper subsystem such as a Non-Volatile Random Access Memory (NVRAM) clear (e.g., "NVRAM_CLR") jumper subsystem that one of skill in the art in possession of the present disclosure will recognize may enable the reset of at least some of the BIOS settings to a default state in response to the connection of a jumper device, as described above.

In another specific example, the BIOS settings modification subsystem 310 may include a BIOS battery (e.g., a Complementary Metal-Oxide Semiconductor (CMOS) battery) that one of skill in the art in possession of the present disclosure will appreciate may allow for a reset of system configurations to a default state if removed. For example, while BIOS settings are no longer stored in the CMOS in most computing devices, one of skill in the art in possession of the present disclosure will appreciate how some BIOS may be configured to erase BIOS settings in response to removal of a CMOS battery (e.g., in order to mimic the behavior of a CMOS in past computing devices that stores BIOS settings and loses those BIOS settings when the CMOS battery is removed). However, while some specific examples of BIOS settings modifications subsystem components have been described, one of skill in the art in possession of the present disclosure will appreciate how the BIOS settings modification subsystem may include other components while remaining within the scope of the present disclosure as well.

As illustrated, the chassis 302 may also house a BIOS authentication modification subsystem 312 that is coupled to the BIOS lockdown engine 304 (e.g., via a coupling between the BIOS authentication modification subsystem 312 and the processing system). In specific example, the BIOS authentication modification subsystem 312 may be provided by a physical jumper subsystem such as a password enable (e.g., "PWD_EN") jumper subsystem that one of skill in the art in possession of the present disclosure will recognize allows for the disabling of a BIOS password (or other authentication information) in response to the removal of a jumper device, as described above. However, while a specific example of a BIOS authentication modification subsystem component has been described, one of skill in the art in possession of the present disclosure will appreciate how the BIOS authentication modification subsystem may include other components while remaining within the scope of the present disclosure as well.

The chassis 302 may also house a Baseboard Management Controller (BMC) device 314 that is coupled to the BIOS lockdown engine 304 (e.g., via a coupling between the BMC device 314 and the processing system). In an embodiment, the BMC device 314 may be provided by an integrated DELL® Remote Access Controller (iDRAC) provided in server devices available from DELL® Inc. of Round Rock, Texas, United States. As such, one of skill in the art in possession of the present disclosure will appreciate how the BMC device 314 may provide an Out-Of-Band (OOB) management platform that uses primarily separate resources from the computing device 300 to provide a browser-based interface or Command Line Interface (CLI) for managing and monitoring the computing device 314 and its components. However, while a specific BMC device has been described, one of skill in the art in possession of the present disclosure will appreciate how other BMC devices will fall within the scope of the present disclosure as well.

The chassis 302 may also house a communication system 316 that is coupled to the BIOS lockdown engine 304 (e.g., via a coupling between the communication system 316 and the processing system) and the BMC device 314 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the computing device configuration modification prevention functionality discussed below, while remaining within the scope of the present disclosure as well.

Figure 4:
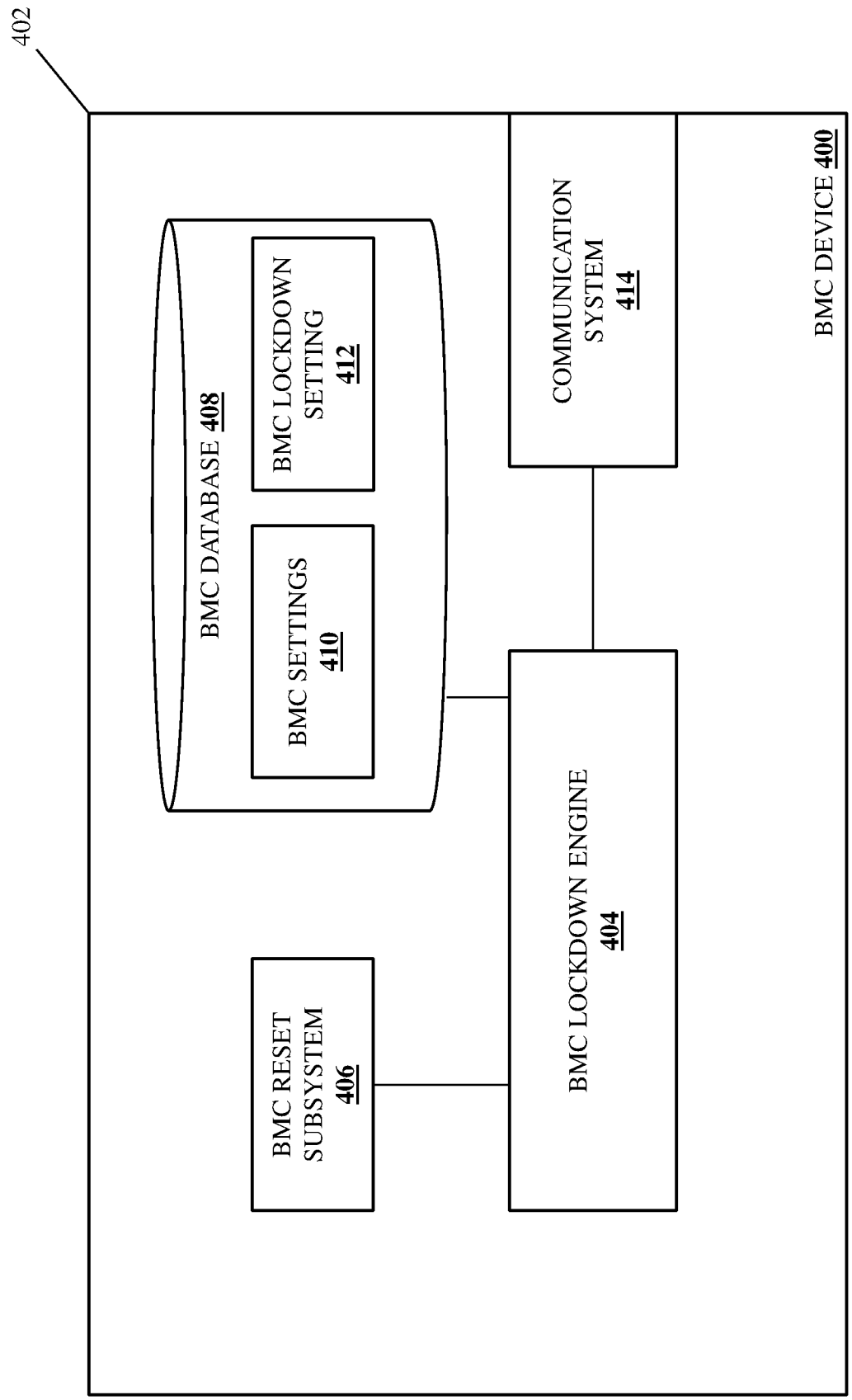
FIG. 4 is a schematic view illustrating an embodiment of a Baseboard Management Controller (BMC) device that may be included in the computing device of FIG. 3 and that may provide the computing device configuration modification prevention system of the present disclosure.

Referring now to FIG. 4, an embodiment of a BMC device 400 is illustrated that may provide the BMC device 314 discussed above with reference to FIG. 3. As such, the BMC device 400 may be provided by the iDRAC discussed above, and thus may provide an OOB management platform that uses primarily separate resources from the computing device 206/300 to provide a browser-based interface or CLI for managing and monitoring the computing device 314 and its components. In the illustrated embodiment, the BMC device 400 includes a chassis 402 (e.g., a circuit board, card, or other BMC device chassis that would be apparent to one of skill in the art in possession of the present disclosure) that supports the components of the BMC device 400, only some of which are illustrated and discussed below. For example, the chassis 402 may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC lockdown engine 404 that is configured to perform the functionality of the BMC lockdown engines, BMC lockdown subsystems, and/or BMC devices discussed below.

The chassis 402 may also house a BMC reset subsystem 406 that is coupled to the BMC lockdown engine 404 (e.g., via a coupling between the BMC reset subsystem 406 and the BMC processing system). In specific example, the BMC reset subsystem 406 may be provided by a physical jumper subsystem (e.g., a hardware jumper subsystem coupled to a General Purpose Input/Output (GPIO) connection on a Complex Programmable Logic Device (CPLD)) that one of skill in the art in possession of the present disclosure will recognize may enable the reset of BMC device 400 to a default state in response to the connection of a jumper device.

The chassis 402 may also house a BMC storage system (not illustrated, but which may be similar to the storage 108 discussed above with reference to FIG. 1) that is coupled to the BMC lockdown engine 404 (e.g., via a coupling between the BMC storage system and the BMC processing system) and that includes a BMC database 408 that is configured to store any of the information utilized by the BMC lockdown engine 404 discussed below. For example, in the illustrated embodiment, the BMC database 408 stores BMC settings 410 that may include BMC configuration operations, BMC network settings, BMC security policies, and/or other BMC settings that would be apparent to one of skill in the art in possession of the present disclosure. Furthermore, in the illustrated embodiment, the BMC database 408 also stores a BMC lockdown setting 412 that one of skill in the art in possession of the present disclosure will recognize may include any hardware and/or software data structure that allows or enables the BMC lockdown mode described below. However, while a variety of different BMC database information has been described, one of skill in the art in possession of the present disclosure will appreciate how the BMC database 408 may store other information while remaining within the scope of the present disclosure as well.

The chassis 402 may also house a communication system 414 that is coupled to the BMC lockdown engine 404 (e.g., via a coupling between the communication system 414 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific BMC device 400 has been illustrated and described, one of skill in the art in possession of the present disclosure will recognize that the BMC device 400 (or other devices operating according to the teachings of the present disclosure in a manner similar to that described below for the BMC device 400) may include a variety of components and/or component configurations for providing conventional computing device functionality, as well as the computing device configuration modification prevention functionality discussed below, while remaining within the scope of the present disclosure as well.

Figure 5:
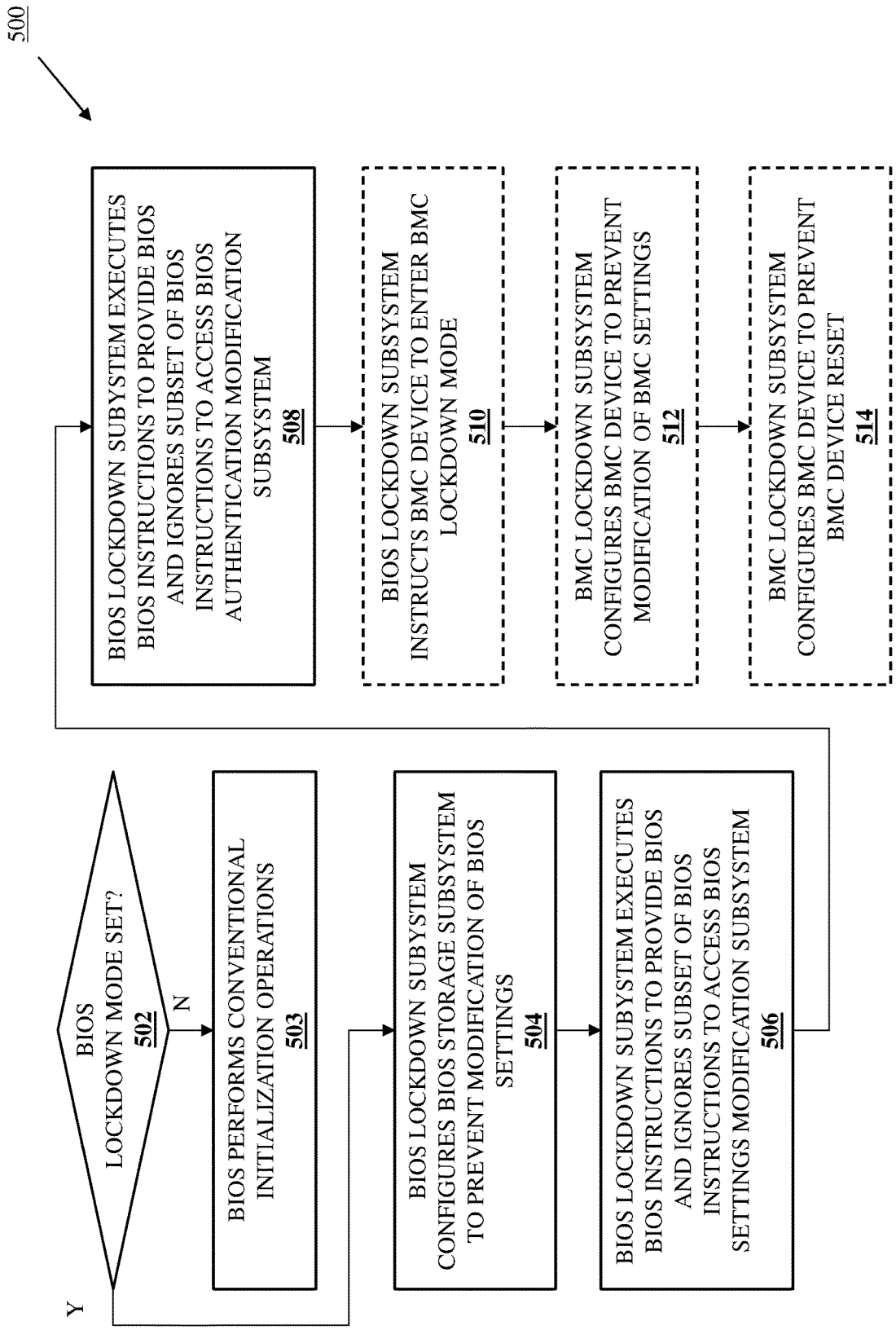
FIG. 5 is a flow chart illustrating an embodiment of a method for preventing modification of a configuration of a computing device.

Referring now to FIG. 5, an embodiment of a method 500 for preventing modification of a configuration of a computing device is illustrated. As discussed below, the systems and methods of the present disclosure provide a lockdown mode for a computing device that configures the computing device to prevent modification of settings or other configurations of the computing device, as well as ignore instructions to access subsystems that may be used to modify settings or other configurations of the computing devices. For example, the computing device configuration modification prevention system of the present disclosure may include a chassis that houses a Basic Input/Output System (BIOS) storage subsystem that stores a BIOS authentication information and BIOS settings, a BIOS settings modification subsystem and a BIOS authentication modification subsystem, and a BIOS lockdown subsystem that is coupled to the BIOS storage subsystem, the BIOS settings modification subsystem, and the BIOS authentication modification subsystem. The BIOS lockdown subsystem determines that a BIOS lockdown mode is set and configures the BIOS storage subsystem to prevent modification of the BIOS settings. The BIOS lockdown subsystem then executes first BIOS instructions to provide a BIOS while ignoring a subset of the first BIOS instructions to access the BIOS settings modification subsystem, and executes second BIOS instructions to provide the BIOS while ignoring a subset of the second BIOS instructions to access the BIOS authentication modification subsystem. As such, computing devices may be "locked down" to prevent modification of their configurations, which may be particularly beneficial in situations where computing devices are deployed in locations that present security challenges like those described above.

Figure 6A:
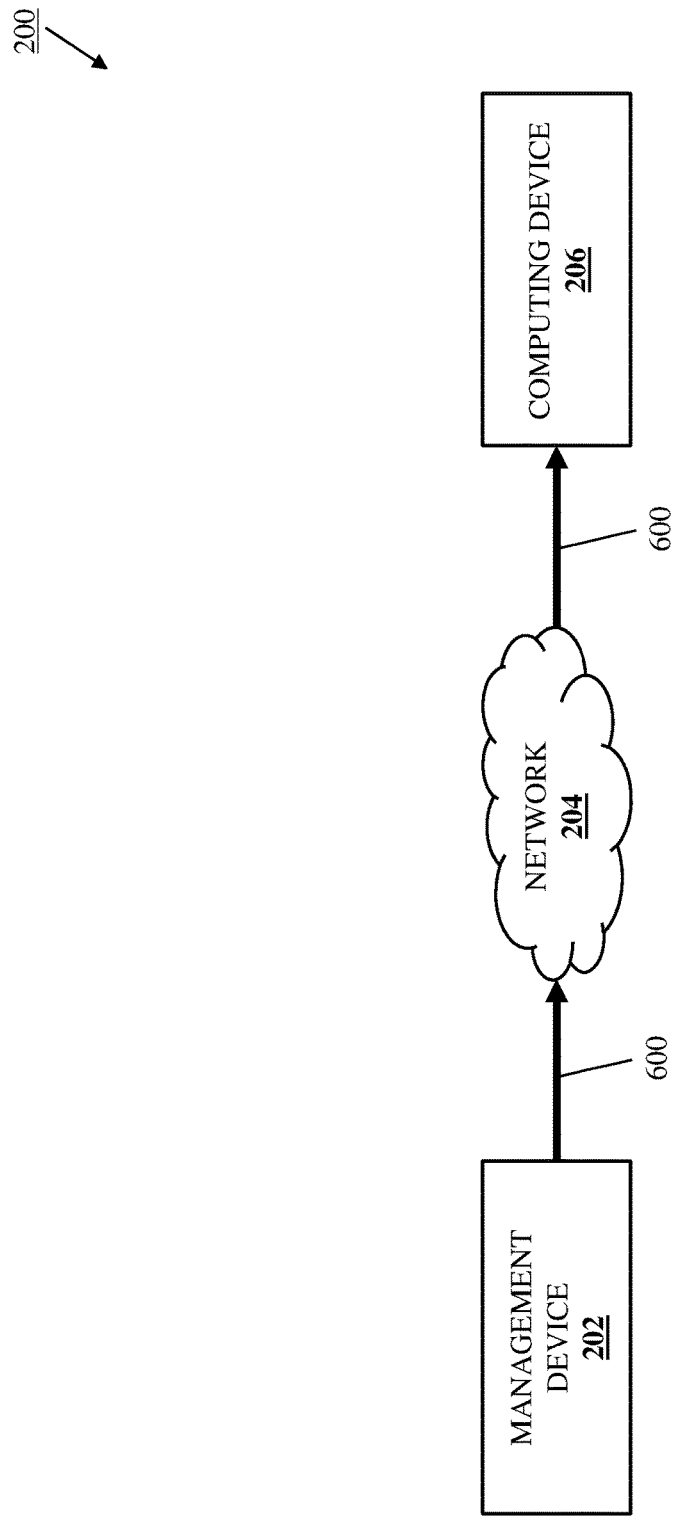
FIG. 6A is a schematic view illustrating an embodiment of the networked system of FIG. 2 operating during the method of FIG. 5.
Figure 6B:
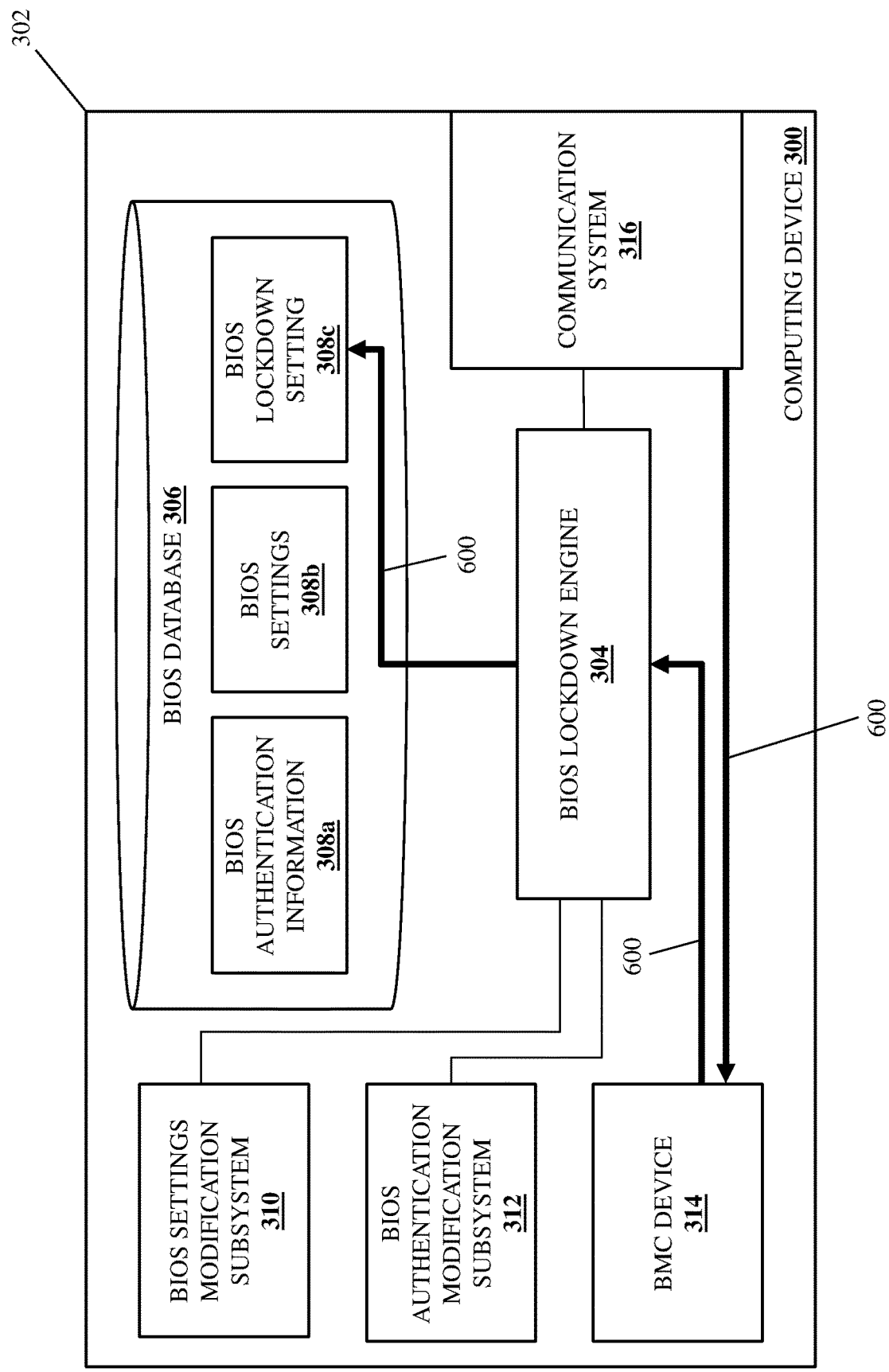
FIG. 6B is a schematic view illustrating an embodiment of the computing device of FIG. 3 operating during the method of FIG. 5.

During or prior to the method 500, a network administrator or other user of the computing device 300 may configure the computing device 300 with, for example, the BIOS settings, BIOS authentication information, and BMC settings described below, and/or any other configurations that would be apparent to one of skill in the art in possession of the present disclosure. Following the configuration of the computing device 300, the network administrator or other user may set a BIOS lockdown mode in the computing device 206/300. With reference to FIGS. 6A and 6B, in one embodiment, the management device 202 and the computing device 206/300 may perform BIOS lockdown mode setting operations 600 that, in the illustrated example, include the management device 202 generating and transmitting a management device BIOS lockdown mode setting instruction (e.g., an Intelligent Platform Management Interface (IPMI) command) via the network 204 to the computing device 206/300. As illustrated, the BIOS lockdown mode setting operations 600 may also include the BMC device 314 in the computing device 206/300 receiving the management device BIOS lockdown mode setting instruction via the communication system 316 and, in response, generating and transmitting a BMC device BIOS lockdown mode setting instruction to the BIOS lockdown engine 304.

In response to receiving the BMC device BIOS lockdown mode setting instruction, the BIOS lockdown engine 304 may complete the BIOS lockdown mode setting operations 600 by performing BIOS lockdown mode activation operations that include activating the BIOS lockdown setting 308c in the BIOS database 306. To provide a specific example, the activation of the BIOS lockdown setting 308c may include the setting of a flag or other lockdown mode identifier in region of a Serial Peripheral Interface (SPI) flash storage device that is dedicated for the personality module described herein, and one of skill in the art in possession of the present disclosure will appreciate how such a region of the SPI flash storage device is not included in an NVRAM region in which the BIOS settings 308b are stored (and thus is not subject to erasure during "NVRAM_CLR" operations described herein). As will be appreciated by one of skill in the art in possession of the present disclosure, activation of the BIOS lockdown setting 308c may configure the computing device 300 in the BIOS lockdown mode described below in order to prevent modification of the configurations provided for the computing device 300 as described above.

Figure 7:
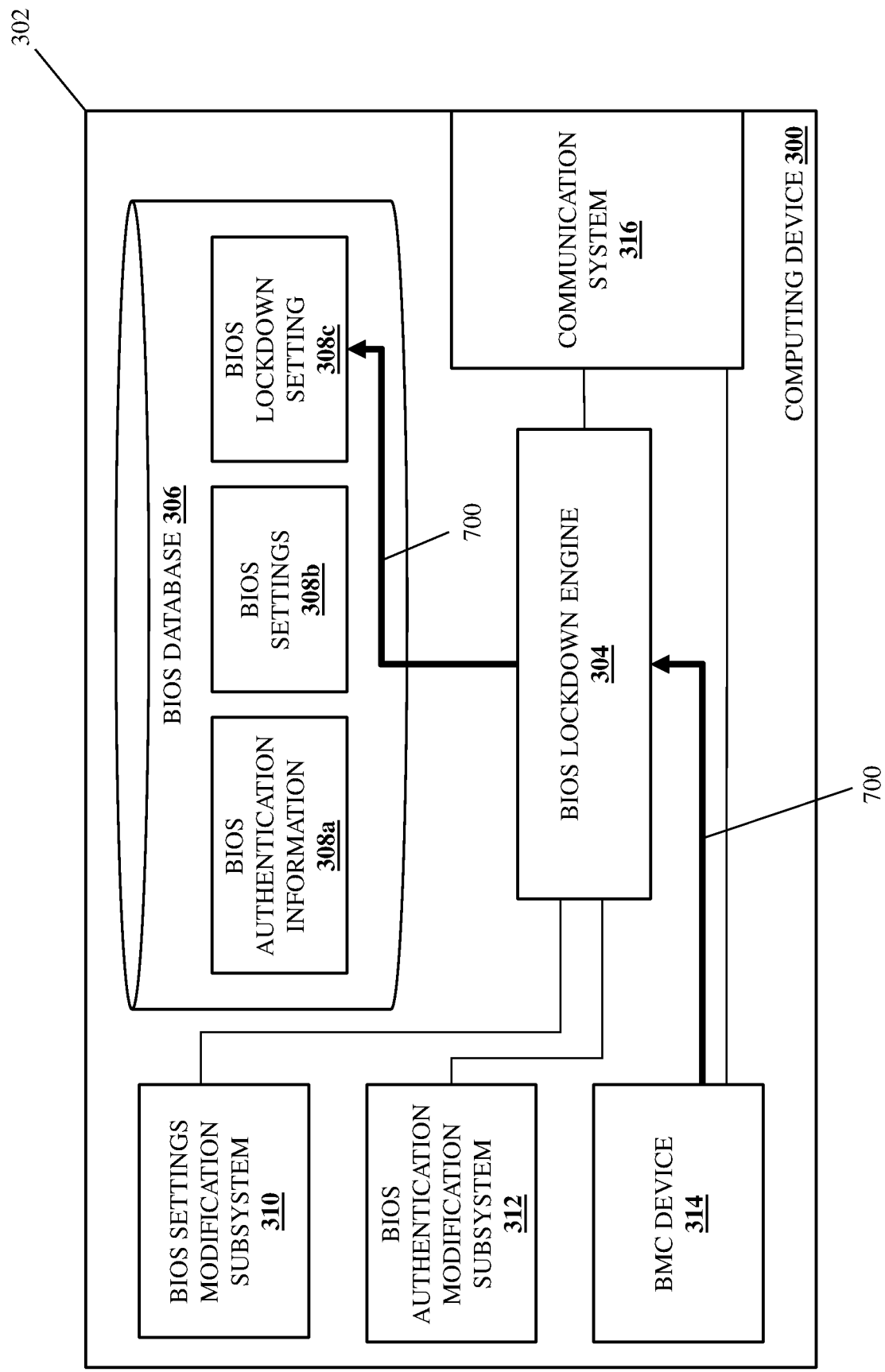
FIG. 7 is a schematic view illustrating an embodiment of the computing device of FIG. 3 operating during the method of FIG. 5.

With reference to FIG. 7, in another embodiment, the BMC device 314 may perform BIOS lockdown mode setting operations 700 that, in the illustrated example, include the BMC device 314 generating and transmitting a BMC device BIOS lockdown mode setting instruction to the BIOS lockdown engine 304. In response to receiving the BMC device BIOS lockdown mode setting instruction, the BIOS lockdown engine 304 may complete the BIOS lockdown mode setting operations 700 by performing BIOS lockdown mode activation operations that include activating the BIOS lockdown setting 308c in the BIOS database 306 similarly as described above, which one of skill in the art in possession of the present disclosure will recognize may configure the computing device 300 in the BIOS lockdown mode described below in order to prevent modification of the configurations provided for the computing device 300 as described above.

In a specific example, a "personality module" (e.g., an Original Equipment Manufacturer (OEM) Identity Module available from DELL® Inc. of Round Rock, Texas, United States), which is conventionally used to enable OEMs to rebrand and customize the computing device 300, may be configured to enable the BIOS lockdown mode and may be provided on the BMC device 314 during the manufacture of the computing device 300, following the provisioning of the computing device 300 to a user, and/or at any other time that would be apparent to one of skill in the art in possession of the present disclosure. As will be appreciated by one of skill in the art in possession of the present disclosure, such a personality module may be signed by a computing device manufacturer using a private key, and following initialization of the computing device 300 subsequent to providing the personality module on the BMC device 314, the personality module may be verified by the BMC device 314 using a public key of the computing device manufacturer, and then written to the BIOS database 306 in order to activate the BIOS lockdown mode. However, while a few specific examples of the setting of the BIOS lockdown mode have been described, one of skill in the art in possession of the present disclosure will appreciate how the BIOS lockdown mode of the present disclosure may be set using a variety of techniques that will fall within the scope of the present disclosure as well.

Figure 8:
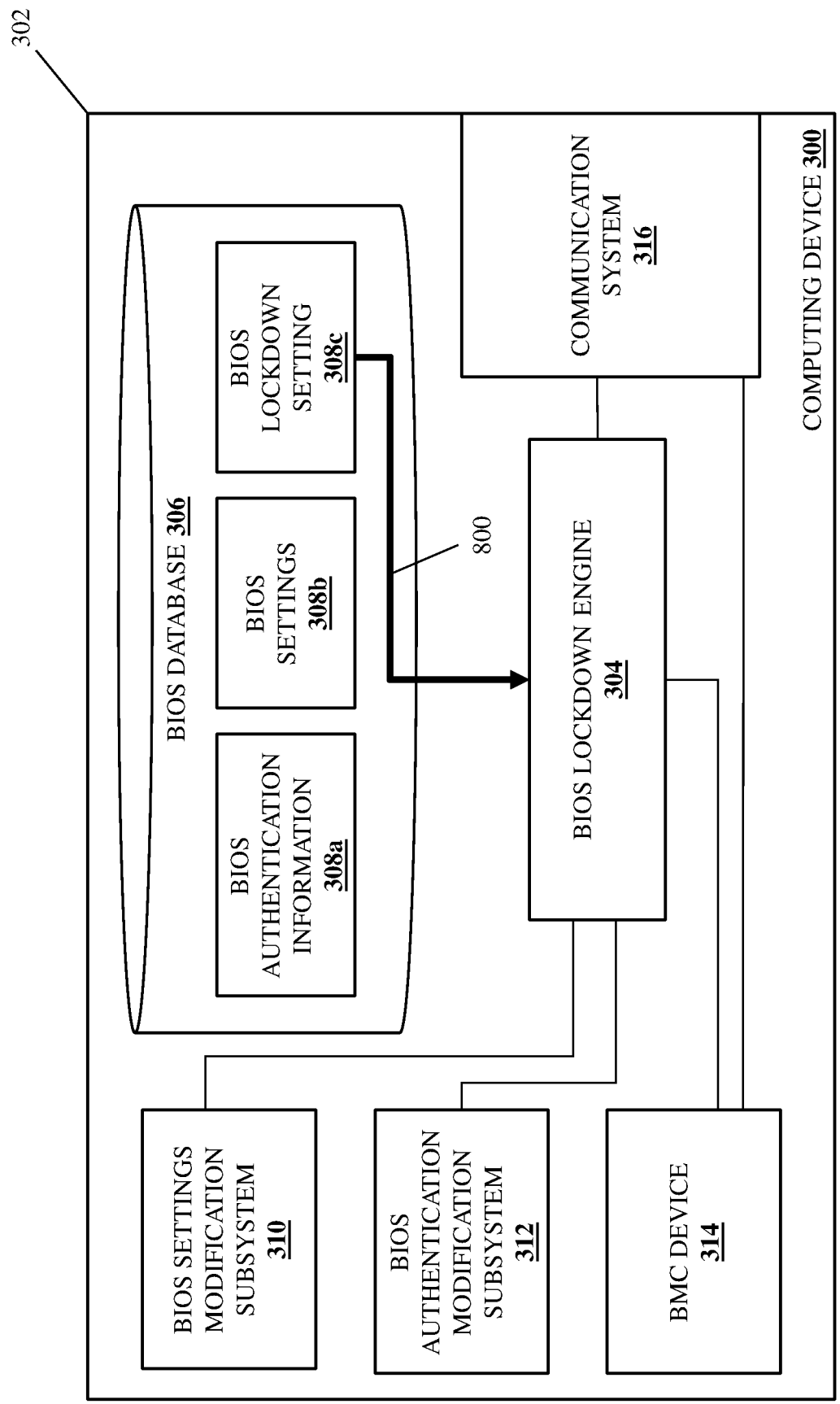
FIG. 8 is a schematic view illustrating an embodiment of the computing device of FIG. 3 operating during the method of FIG. 5.

The method 500 begins at decision block 502 where it is determined whether a BIOS lockdown mode is set. With reference to FIG. 8, in an embodiment of decision block 502, the computing device 300 may be powered on, reset, rebooted, and/or otherwise initialized and, in response, the BIOS lockdown engine 304 in the computing device 206/300 may perform BIOS lockdown mode determination operations 800 that include accessing the BIOS database 306 to determine whether the BIOS lockdown setting 308c has been activated (e.g., via the flag set as described above). If, at decision block 502, it is determined that the BIOS lockdown mode is not set, the method 500 proceeds to block 503 where a BIOS performs convention initialization operations (e.g., a conventional Power-On Start Up (POST)) that one of skill in the art in possession of the present disclosure will appreciate may operate to initialize the computing device 300 such that it enters a runtime state (e.g., in which an operating system controls the computing device 300).

Figure 9:
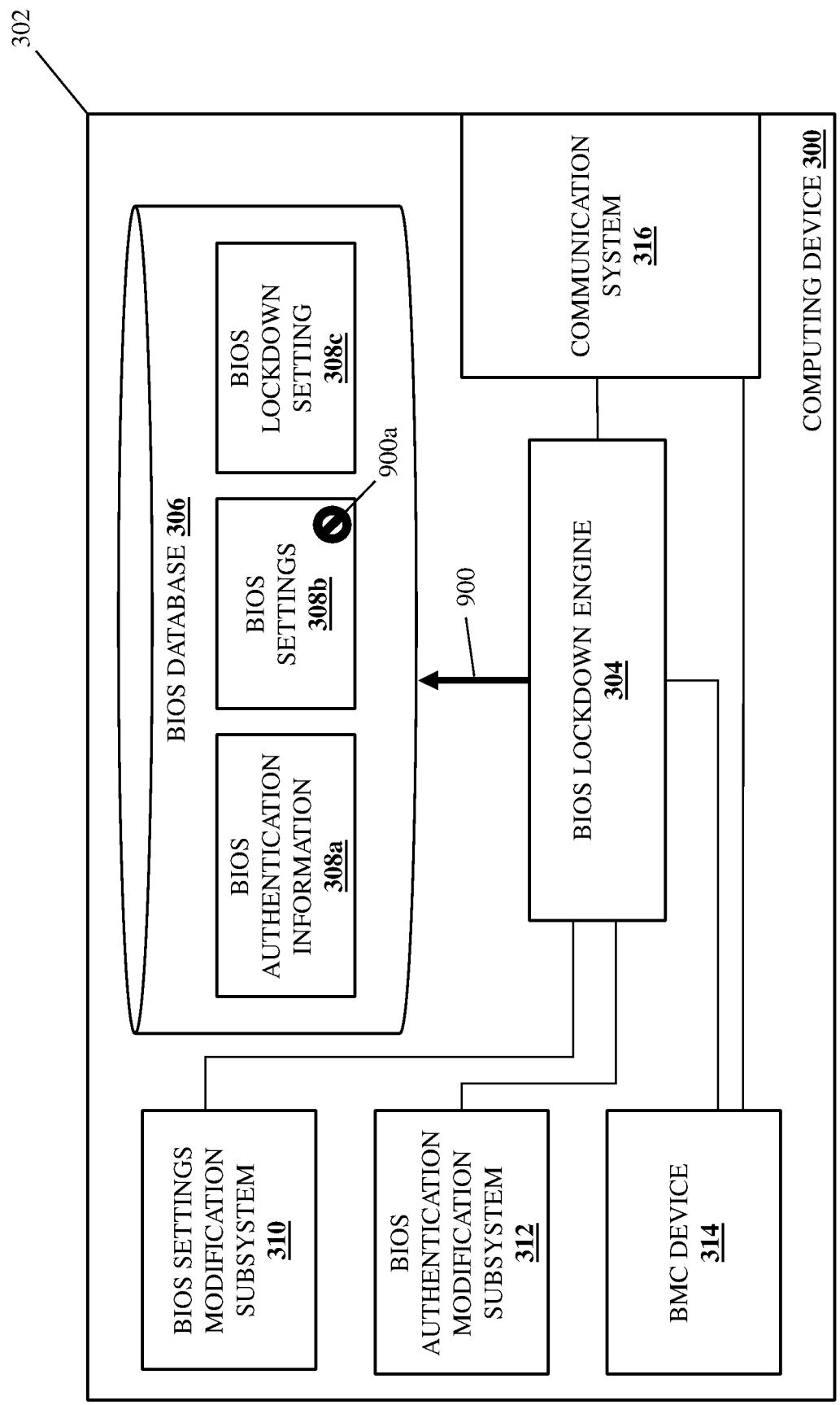
FIG. 9 is a schematic view illustrating an embodiment of the computing device of FIG. 3 operating during the method of FIG. 5.

If, at decision block 502, it is determined that the BIOS lockdown mode is set, the method 500 proceeds to block 504 where the BIOS lockdown subsystem configures the BIOS storage subsystem to prevent modification of BIOS settings. With reference to FIG. 9, at block 504 and in response to determining that the BIOS lockdown mode is set at decision block 502, the BIOS lockdown engine 304 may perform BIOS settings modification prevention operations 900 that include configuring the BIOS storage system that provides the BIOS database 306 to prevent modifications to the BIOS settings 308b (as illustrated by element 900a in FIG. 9), and/or configuring the BIOS storage system that provides the BIOS database 306 to prevent modifications to any other BIOS information that would be apparent to one of skill in the art in possession of the present disclosure.

In a specific example, the BIOS settings modification prevention operations 900 may include configuring any BIOS setup options included in the BIOS settings 308b as read-only, disabling BIOS configuration change interfaces for BIOS configurations (e.g., disabling write interfaces to BIOS attributes) stored in the BIOS settings 308b, and/or performing any other operations that one of skill in the art in possession of the present disclosure would recognize as preventing the modification of BIOS settings. However, while a few specific examples of the prevention of modification of BIOS settings have been described, one of skill in the art in possession of the present disclosure will appreciate how modification of BIOS settings may be prevented in a variety of manners that will fall within the scope of the present disclosure as well.

Figure 10:
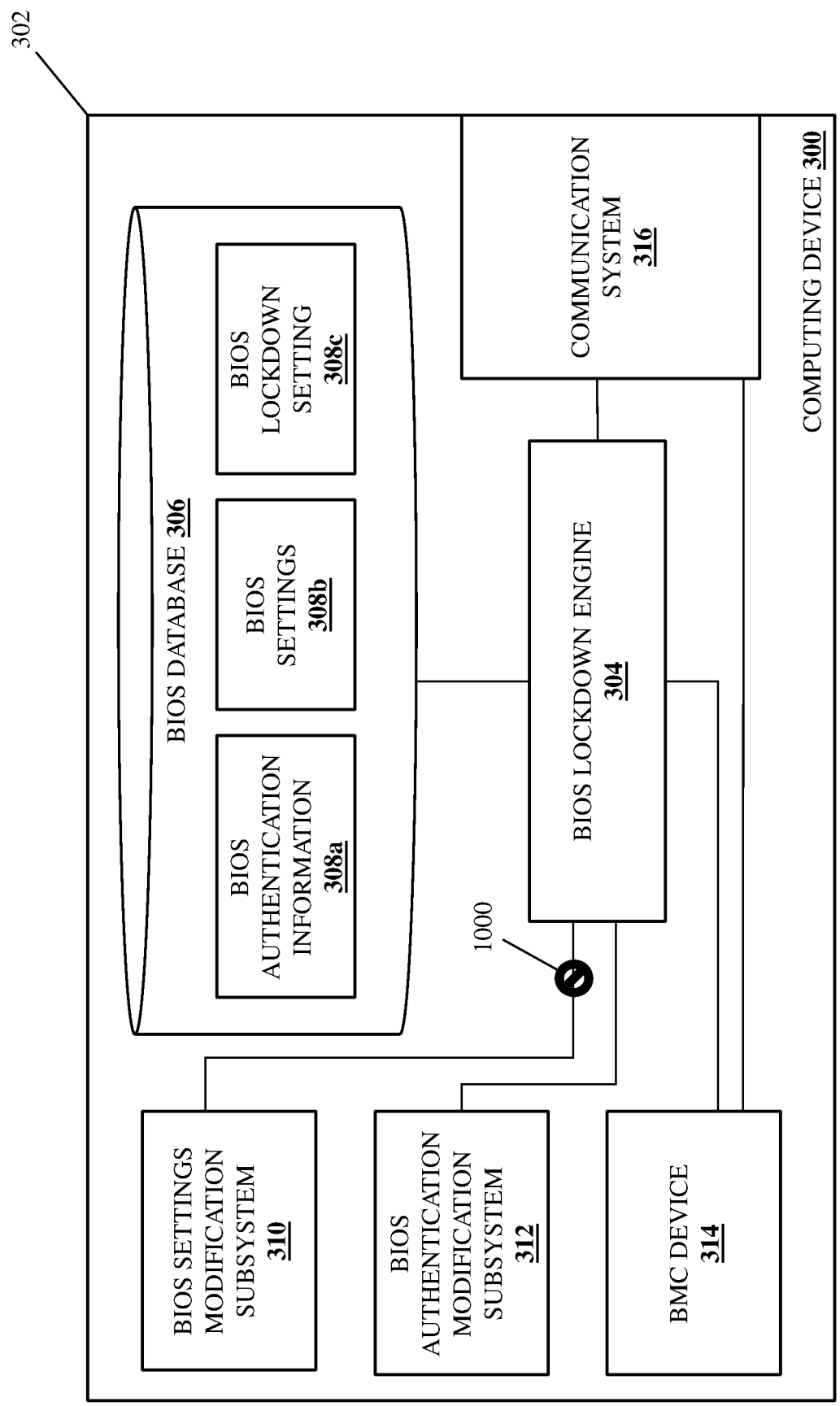
FIG. 10 is a schematic view illustrating an embodiment of the computing device of FIG. 3 operating during the method of FIG. 5.

The method 500 then proceeds to block 506 where the BIOS lockdown subsystem executes BIOS instructions to provide a BIOS and ignores a subset of the BIOS instructions to access a BIOS settings modification subsystem. With reference to FIG. 10, at block 506, the BIOS lockdown engine 304 may perform first BIOS lockdown mode BIOS instruction execution operations that include executing first BIOS instructions (e.g., BIOS code) to provide a BIOS while ignoring a subset of those first BIOS instructions that instruct the BIOS to access the BIOS settings modification subsystem 310, which operates to prevents the BIOS from accessing the BIOS setting modification subsystem 310 (as illustrated by element 1000 in FIG. 10).

In a specific example, while in the BIOS lockdown mode (i.e., in response to determining that the BIOS lockdown mode is set at decision block 502), the BIOS lockdown engine 304 is configured to execute BIOS code to provide the BIOS for the computing device 300 while bypassing portions of that BIOS code that would otherwise cause the BIOS to check for the presence of a physical jumper device on an NVRAM_CLR jumper subsystem that is included in the BIOS settings modification subsystem 310. As discussed above, the connection of a physical jumper device to a NVRAM_CLR jumper subsystem may clear the configurations stored in a NVRAM and may allow the reset of BIOS setting options to a default setting, and one of skill in the art in possession of the present disclosure will appreciate how the bypassing of portion(s) of the BIOS code that instruct the checking of the NVRAM_CLR jumper subsystem will prevent such actions from clearing configurations stored in the NVRAM and allowing the BIOS settings options to be reset to a default setting.

In another specific example, while in the BIOS lockdown mode (i.e., in response to determining that the BIOS lockdown mode is set at decision block 502), the BIOS lockdown engine 304 is configured to execute BIOS code to provide the BIOS for the computing device 300 while bypassing portions of that BIOS code that would otherwise cause the BIOS to check for the presence of (or for power from) a CMOS battery that is included the BIOS settings modification subsystem 310. As discussed above, the removal of a CMOS battery may allow the reset of BIOS setting options to a default setting, and one of skill in the art in possession of the present disclosure will appreciate how the bypassing of portion(s) of the BIOS code that instruct the checking for the presence of (or for power from) CMOS battery will prevent such actions from allowing the BIOS settings options to be reset to a default setting. However, while a few specific examples of ignoring instructions to access a BIOS settings modification subsystem have been described, one of skill in the art in possession of the present disclosure will appreciate how a variety of instructions to access a BIOS settings modification subsystem may be ignored while remaining within the scope of the present disclosure as well.

Figure 11:
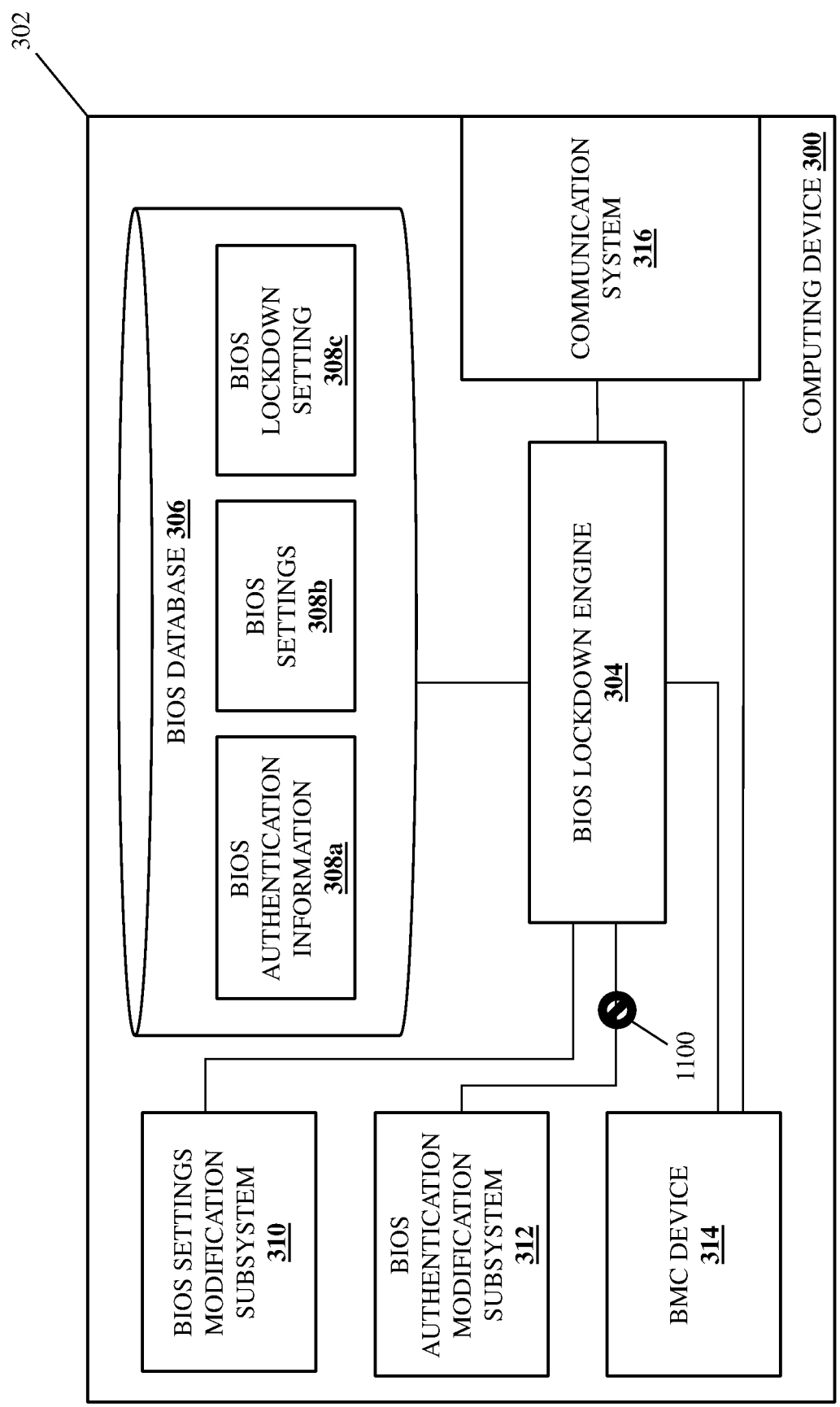
FIG. 11 is a schematic view illustrating an embodiment of the computing device of FIG. 3 operating during the method of FIG. 5.

The method 500 then proceeds to block 508 where the BIOS lockdown subsystem executes the BIOS instructions to provide a BIOS and ignores a subset of the BIOS instructions to access a BIOS authentication modification subsystem. With reference to FIG. 11, at block 508, the BIOS lockdown engine 304 may perform second BIOS lockdown mode BIOS instruction execution operations that include executing second BIOS instructions (e.g., BIOS code) to provide a BIOS while ignoring a subset of those second BIOS instructions that instruct the BIOS to access the BIOS authentication modification subsystem 312, which operates to prevent the BIOS from accessing the BIOS authentication modification subsystem 312 (as illustrated by element 1100).

In a specific example, while in the BIOS lockdown mode (i.e., in response to determining that the BIOS lockdown mode is set at decision block 502), the BIOS lockdown engine 304 is configured to execute BIOS code to provide the BIOS for the computing device 300 while bypassing portions of the BIOS code that would otherwise cause the BIOS to check for a physical jumper device on a PWD_EN jumper subsystem that provides the BIOS authentication modification subsystem 312. As discussed above, the removal of a physical jumper device on a PWD_EN jumper subsystem may disable a BIOS password (or other authentication information), and one of skill in the art in possession of the present disclosure will appreciate how the bypassing of portion(s) of the BIOS code that instruct the checking of the PWD_EN jumper subsystem will prevent such actions from disabling the BIOS authentication information 308*a* (e.g., a BIOS password) and possibly allowing access to the BIOS settings and configurations. However, while a specific example of ignoring instructions to access a BIOS authentication modification subsystem and preventing the disabling of a BIOS authentication information have been described, one of skill in the art in possession of the present disclosure will appreciate how a variety of instructions to access a BIOS authentication modification subsystem may be ignored, and/or BIOS authentication information disabling may be prevented, in a variety of manners while remaining within the scope of the present disclosure as well.

As will be appreciated by one of skill in the art in possession of the present disclosure, blocks 504-508 operate to "lock down" the computing device 300 in order to prevent access to and/or modification of configurations (e.g., BIOS configurations) for the computing device 300, and in many cases such operations may be sufficient to secure the configuration of the computing device 300. However, in some situations, further security measures may be enabled to "lock down" the BMC device in the computing device 300 as well.

Figure 12A:
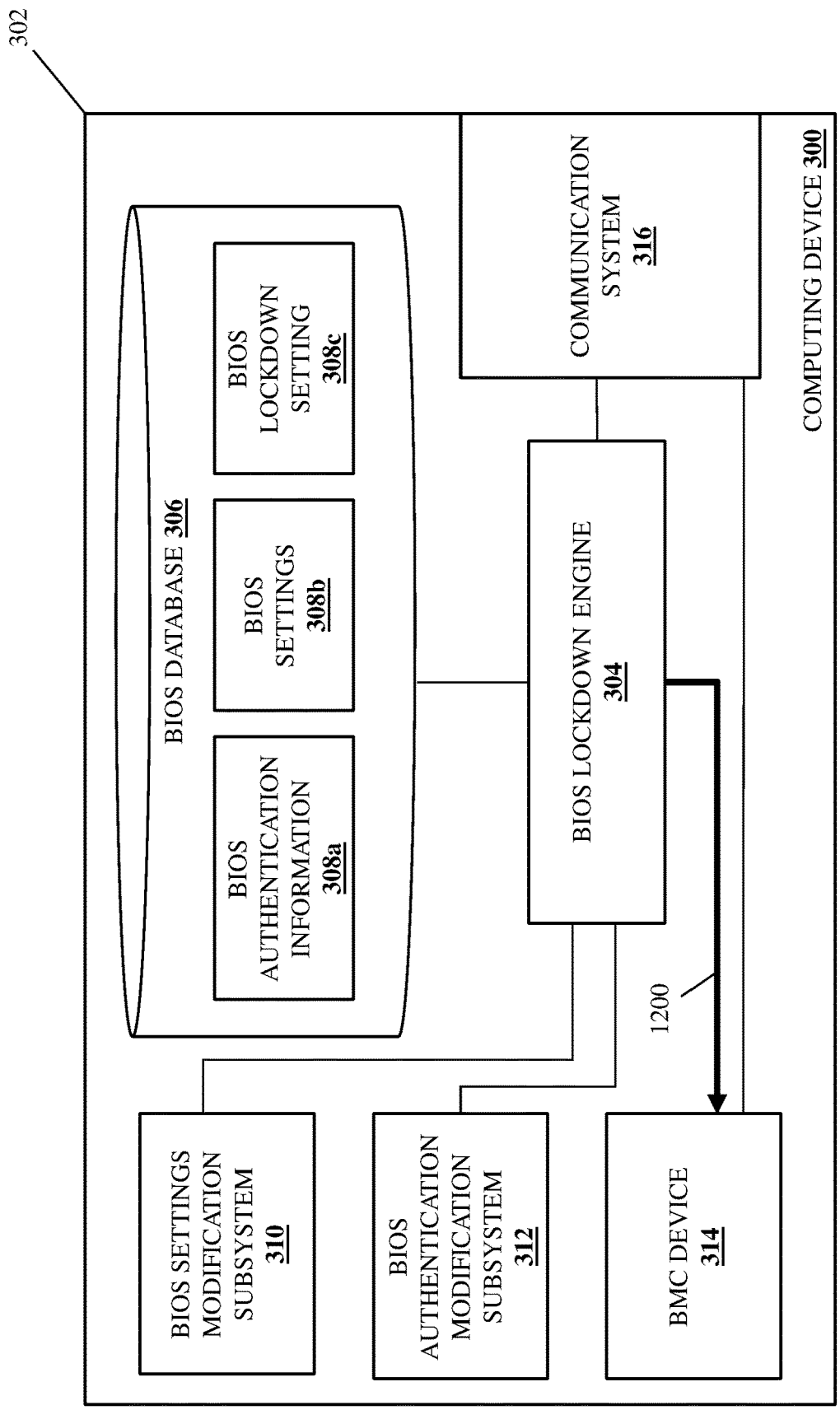
FIG. 12A is a schematic view illustrating an embodiment of the computing device of FIG. 3 operating during the method of FIG. 5.
Figure 12B:
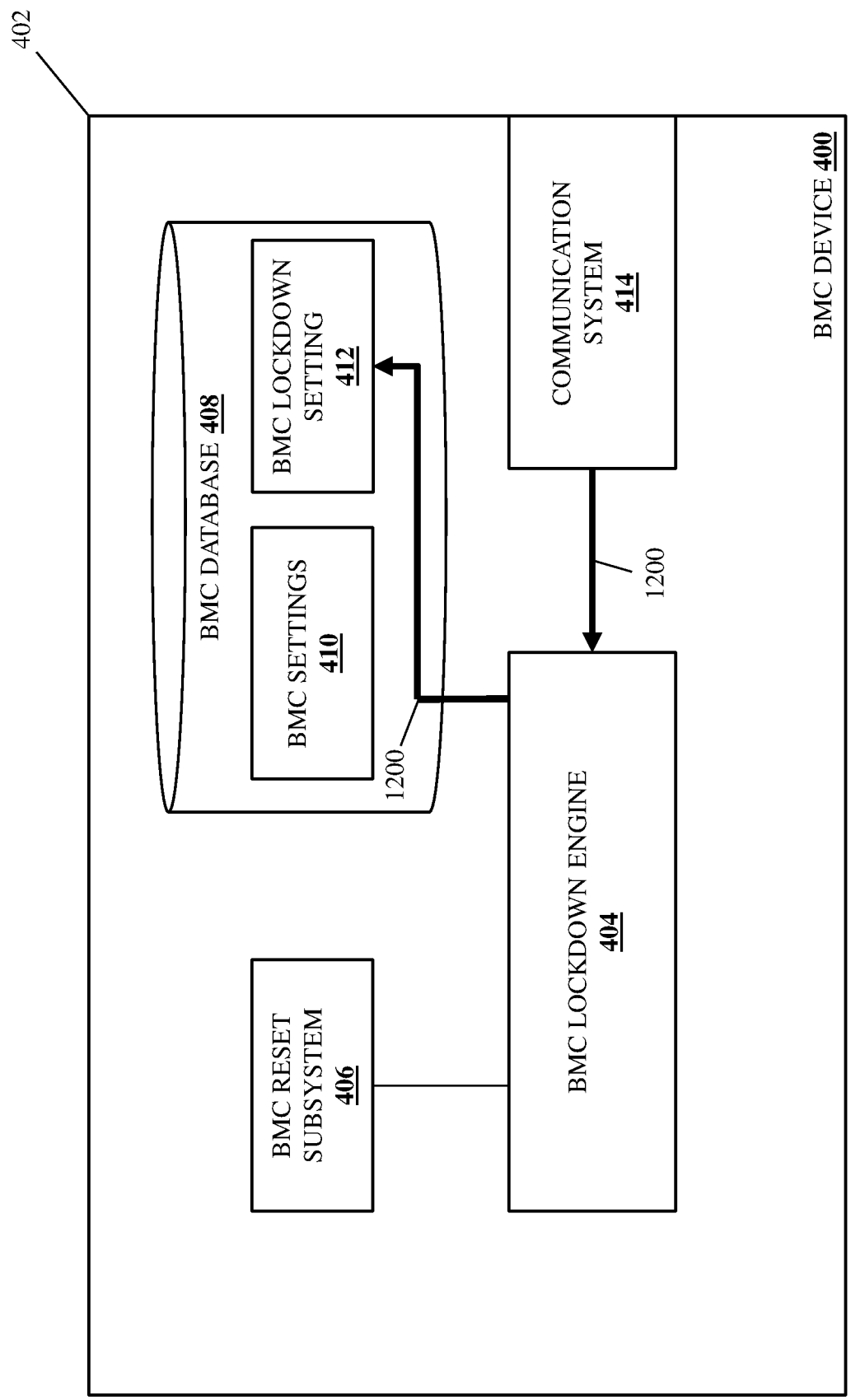
FIG. 12B is a schematic view illustrating an embodiment of the BMC device of FIG. 4 operating during the method of FIG. 5.

For example, following block 508, the method 500 may proceed to optional block 510 where the BIOS lockdown subsystem may instruct a BMC device to enter a BMC lockdown mode. With reference to FIGS. 12A and 12B, in an embodiment, the BIOS lockdown engine 304 and the BMC device 314/400 may perform BMC lockdown mode setting operations 1200 that, in the illustrated example, include the BIOS lockdown engine 304 generating and transmitting a BMC lockdown mode setting instruction to the BMC device 314/400 such that the BMC lockdown engine 404 receives the BMC lockdown mode setting instruction via a communication system 414. In response to receiving the BMC lockdown mode setting instruction, the BMC lockdown engine 404 may complete the BMC lockdown mode setting operations 1200 by performing BMC lockdown mode activation operations that include activating the BMC lockdown setting 412 in the BMC database 408, which one of skill in the art in possession of the present disclosure will recognize may configure the BMC device 314/400 in the BMC lockdown mode described below. However, while a specific example of providing a BMC device in a BMC lockdown mode has been described, one of skill in the art in possession of the present disclosure will appreciate how a BMC device may be provided in a BMC lockdown mode in a variety of manners while remaining within the scope of the present disclosure as well.

Figure 12C:
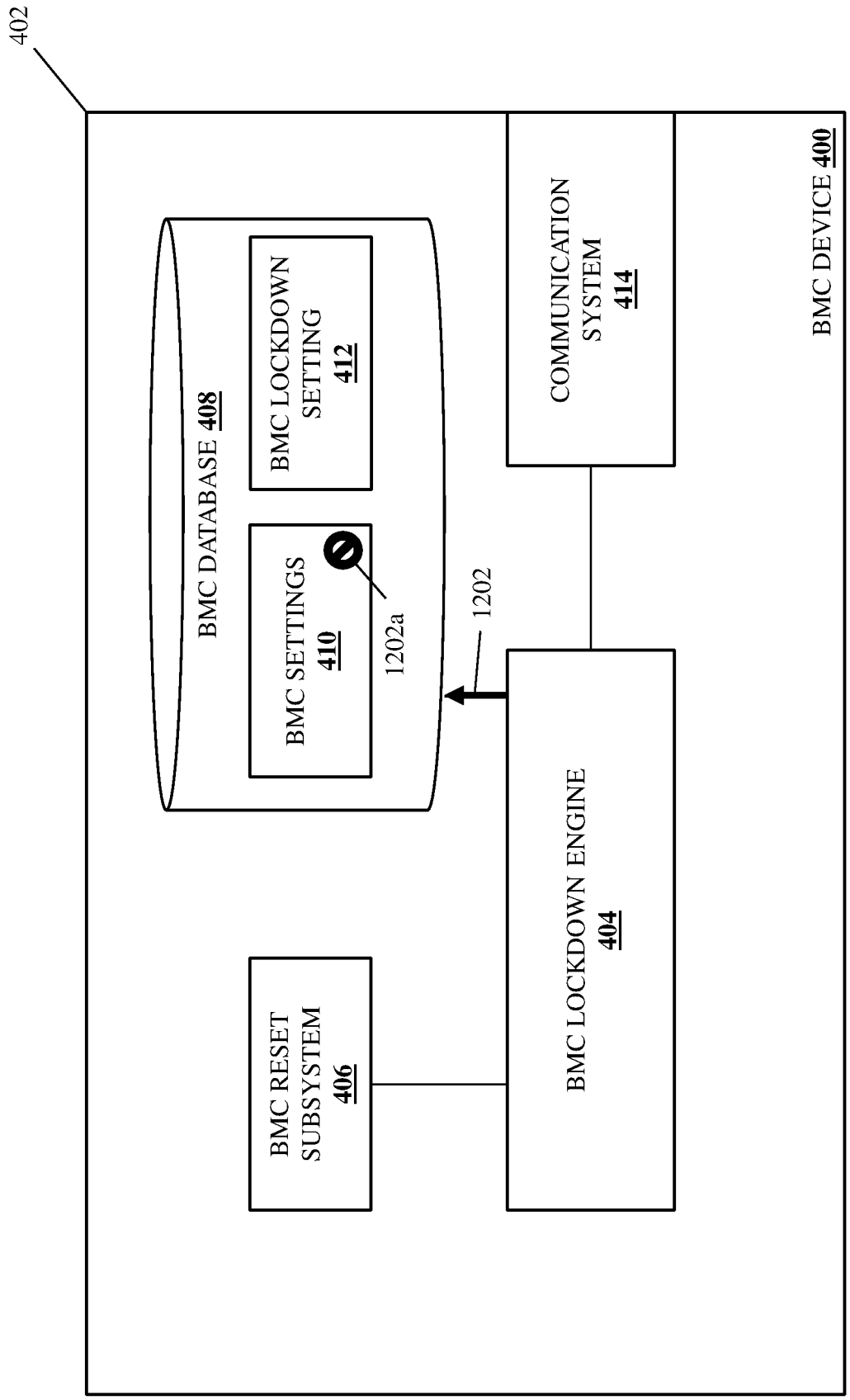
FIG. 12C is a schematic view illustrating an embodiment of the BMC device of FIG. 4 operating during the method of FIG. 5.

The method 500 may then proceed to optional block 512 where the BMC lockdown subsystem may configure the BMC device to prevent modification of BMC settings. In an embodiment, following the configuration of the BMC device 314/400 in the BMC lockdown mode, the BMC device 314/400 may be reset, rebooted, and/or otherwise initialized. With reference to FIG. 12C, at block 512 and in response to the BMC device 314/400 initializing in the BMC lockdown mode, the BMC lockdown engine 404 may determine that it is in the BMC lockdown mode (e.g., via the BMC lockdown setting 412) and, in response, perform BMC settings modification prevention operations 1202 that include configuring the BMC storage system that provides the BMC database 408 to prevent modifications to the BMC settings 410 (as illustrated by element 1202a in FIG. 12C), and/or configuring the BMC storage system that provides the BMC database 408 to prevent modifications to any other BMC information that would be apparent to one of skill in the art in possession of the present disclosure.

In a specific example, the BMC settings modification prevention operations 1202 may be similar to the configuration of the BIOS storage system to prevent modification to the BIOS settings 308b at block 504 as discussed above, and thus may include configuring BMC setup options included in the BMC settings 410 as read-only, disabling BMC configuration change interfaces for BMC configurations stored in the BMC settings 410, and/or performing any other operations that one of skill in the art in possession of the present disclosure would recognize as preventing the modification of BMC settings. However, while a few specific examples of the prevention of the modification of BMC settings have been described, one of skill in the art in possession of the present disclosure will appreciate how modifications of BMC settings may be prevented in a variety of manners that will fall within the scope of the present disclosure as well.

Figure 12D:
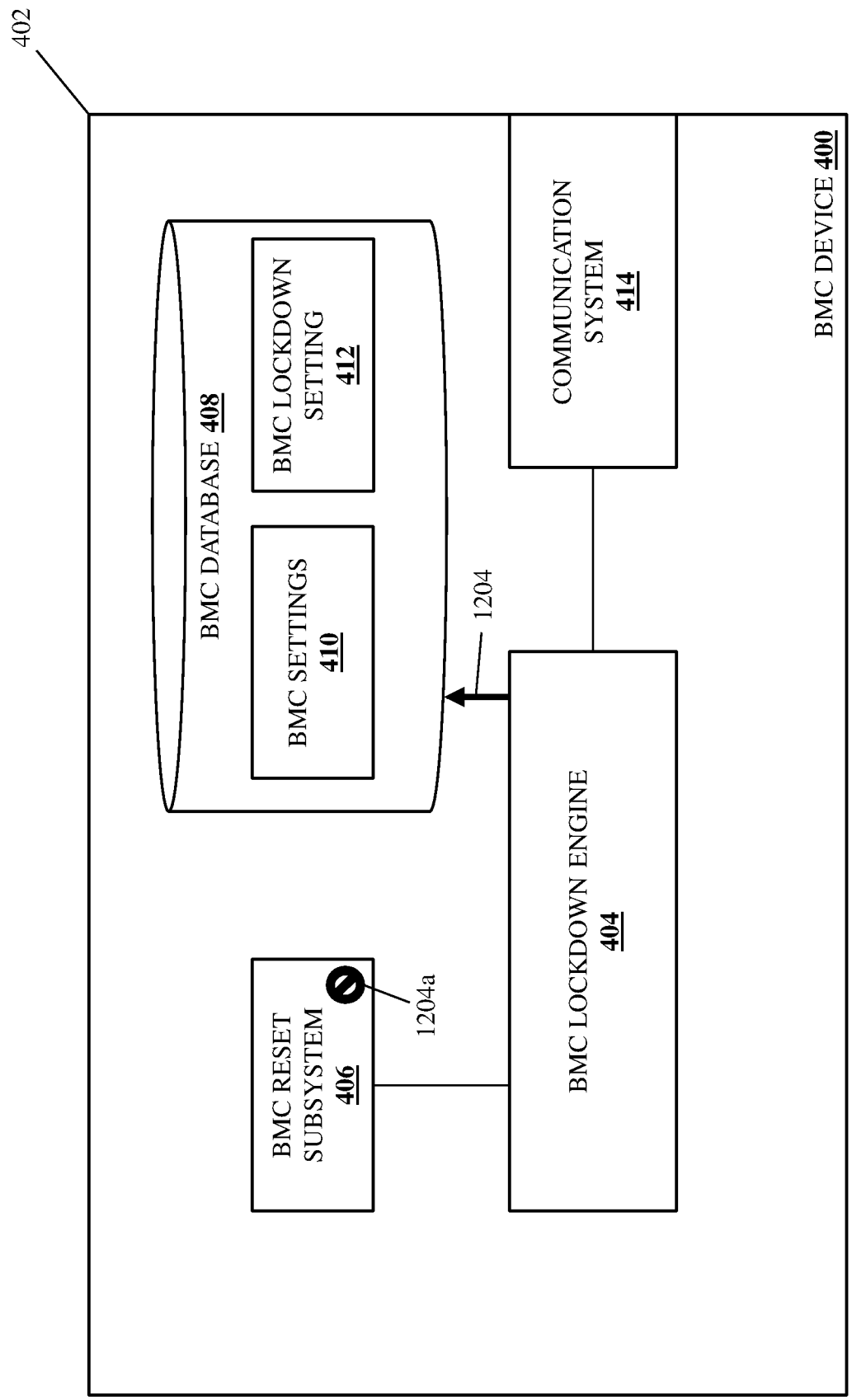
FIG. 12D is a schematic view illustrating an embodiment of the BMC device of FIG. 4 operating during the method of FIG. 5.

The method 500 may then proceed to optional block 514 where the BMC lockdown subsystem may configure the BMC device to prevent a BMC reset. With reference to FIG. 12D, at block 514 and in response the BMC device 314/400 initializing in the BMC lockdown mode, the BMC lockdown engine 404 may determine that it is in the BMC lockdown mode (e.g., via the BMC lockdown setting 412) and, in response, perform BMC reset prevention operations 1204 that include configuring the BMC reset subsystem 406 to prevent BMC reset (as illustrated by element 1204a in FIG. 12D), and/or performing any other operations that one of skill in the art in possession of the present disclosure in the art in possession of the present disclosure would recognize as preventing any instructions and/or commands from enabling the reset of the BMC device 314/400.

To provide a specific example, the BMC reset prevention operations 1204 may include the BIOS lockdown engine 304 operating with the BMC lockdown engine 404 to configure the GPIO discussed above to ignore any reset instructions such that, in the event BMC reset is triggered by a hardware GPIO tied to a BMC chipset reset pin, such reset instructions are ignored and do not result in the reset of the BMC device 400. In another specific example, the BMC reset prevention operations 1204 may include the BMC firmware that provides the BMC lockdown engine 404 disabling a handler to prevent reset of the BMC device 400 in the event BMC reset is controlled by that BMC firmware. However, while specific examples of the prevention of a reset of a BMC device been described, one of skill in the art in possession of the present disclosure will appreciate how a BMC device reset may be prevented in a variety of manners that will fall within the scope of the present disclosure as well.

Following block 508 or optional block 514, the BIOS may complete the initialization of the computing device 300 such that the computing device 300 enters a runtime state in which an operating system takes control of the computing device 300. As will be appreciated by one of skill in the art in possession of the present disclosure, the BIOS lockdown mode and, in some embodiments, BMC lockdown mode may persist across any reboots, and thus the method 300 may be performed as described above until the BIOS lockdown mode is removed.

Thus, systems and methods have been described that provide a lockdown mode for a computing device that configures the computing device to prevent modification of settings or other configurations of the computing device, as well as ignore instructions to access subsystems that may be used to modify settings or other configurations of the computing devices. For example, the computing device configuration modification prevention system of the present disclosure may include a chassis that houses a Basic Input/Output System (BIOS) storage subsystem that stores a BIOS authentication information and BIOS settings, a BIOS settings modification subsystem and a BIOS authentication modification subsystem, and a BIOS lockdown subsystem that is coupled to the BIOS storage subsystem, the BIOS settings modification subsystem, and the BIOS authentication modification subsystem. The BIOS lockdown subsystem determines that a BIOS lockdown mode is set and configures the BIOS storage subsystem to prevent modification of the BIOS settings. The BIOS lockdown subsystem then executes first BIOS instructions to provide a BIOS while ignoring a subset of the first BIOS instructions to access the BIOS settings modification subsystem, and executes second BIOS instructions to provide the BIOS while ignoring a subset of the second BIOS instructions to access the BIOS authentication modification subsystem. As such, computing devices may be "locked down" to prevent modification of their configurations, which may be particularly beneficial in situations where computing devices are deployed in locations that present security challenges like those described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Basic Input/Output System (BIOS) lockdown system, comprising:
    a chassis:
    a Basic Input/Output System (BIOS) storage subsystem that is housed in the chassis and that is configured to store a BIOS authentication information and BIOS settings;
    a BIOS settings modification subsystem that is housed in the chassis;
    a BIOS authentication modification subsystem that is house in the chassis; and a BIOS lockdown subsystem that is housed in the chassis and that is coupled to the BIOS storage subsystem, the BIOS settings modification subsystem, and the BIOS authentication modification subsystem, wherein the BIOS lockdown subsystem is configured to:

determine that a BIOS lockdown mode is set;

configure, in response to determining that the BIOS lockdown mode is set, the BIOS storage subsystem to prevent modification of the BIOS settings;

execute first BIOS instructions to provide a BIOS and, in response to determining that the BIOS lockdown mode is set, ignore a subset of the first BIOS instructions to access the BIOS settings modification subsystem; and execute second BIOS instructions to provide the BIOS and, in response to determining that the BIOS lockdown mode is set, ignore a subset of the second BIOS instructions to access the BIOS authentication modification subsystem.

2. The system of claim 1, wherein the configuring of the BIOS storage subsystem to prevent modification of the BIOS settings includes:

configuring BIOS setup options in the BIOS settings as read only.

3. The system of claim 1, wherein the configuring the BIOS storage subsystem to prevent modification of the BIOS settings includes:

disabling at least one write interface to BIOS attributes in the BIOS settings.

4. The system of claim 1, further comprising:

a Baseboard Management Controller (BMC) device that is housed in the chassis and coupled to the BIOS lockdown subsystem, wherein the BIOS lockdown subsystem is configured to:

configure, in response to determining that the BIOS lockdown mode is set, the BMC device in a BMC lockdown mode.

5. The system of claim 4, wherein the BMC device is configured to:

configure, in response to the BMC device being configured in the BMC lockdown mode, the BMC storage subsystem to prevent modification of BMC settings; and prevent, in response to the BMC device being configured in the BMC lockdown mode, a BMC device reset.

6. The system of claim 1, wherein the BIOS authentication modification subsystem includes a first physical jumper subsystem, and wherein the BIOS settings modification subsystem includes at least one of a second physical jumper subsystem and a BIOS battery.

7. An Information Handling System (IHS), comprising:

a BIOS processing system; and a BIOS memory system that is coupled to the BIOS processing system and that includes instructions that, when executed by the BIOS processing system, cause the BIOS processing system to provide a BIOS lockdown engine that is configured to:

determine that a BIOS lockdown mode is set;

configure, in response to determining that the BIOS lockdown mode is set, a BIOS storage subsystem that is coupled to the BIOS processing system to prevent modification of BIOS settings stored in the BIOS storage subsystem;

execute first BIOS instructions to provide a BIOS and, in response to determining that the BIOS lockdown mode is set, ignore a subset of the first BIOS instructions to access a BIOS settings modification subsystem that is coupled to the BIOS processing system; and execute second BIOS instructions to provide the BIOS and, in response to determining that the BIOS lockdown mode is set, ignore a subset of the second BIOS instructions to access a BIOS authentication modification subsystem that is coupled to the BIOS processing system.

8. The IHS of claim 7, wherein the configuring the BIOS storage subsystem to prevent modification of the BIOS settings includes:

configuring BIOS setup options in the BIOS settings as read only.

9. The IHS of claim 7, wherein the configuring the BIOS storage subsystem to prevent modification of the BIOS settings includes:

disabling at least one write interface to BIOS attributes in the BIOS settings.

10. The IHS of claim 7, wherein the BIOS lockdown engine is configured to:

configure, in response to determining that the BIOS lockdown mode is set, a BMC device that is coupled to the BIOS lockdown processing system in a BMC lockdown mode.

11. The IHS of claim 10, further comprising:

a BMC processing system; and a BMC memory system that is coupled to the BMC processing system and that includes instructions that, when executed by the BMC processing system, cause the BMC processing system to provide a BMC lockdown engine that is configured to:

configure, in response to the BMC device being configured in the BMC lockdown mode, a BMC storage subsystem that is coupled the BMC processing system to prevent modification of BMC settings; and prevent, in response to the BMC device being configured in the BMC lockdown mode, a BMC device reset.

12. The IHS of claim 7, wherein the BIOS authentication modification subsystem includes a first physical jumper subsystem, and wherein the BIOS settings modification subsystem includes at least one of a second physical jumper subsystem and a BIOS battery.

13. The IHS of claim 7, wherein the BIOS lockdown engine is configured to:

set the BIOS lockdown mode in response to one of:

a command received from a management system via a network; or a command received from a personality module that is housed in the chassis.

14. A method for preventing modification of a configuration of a computing device, comprising:

determining, by a BIOS lockdown subsystem, that a BIOS lockdown mode is set;

configuring, by the BIOS lockdown subsystem in response to determining that the BIOS lockdown mode is set, a BIOS storage subsystem to prevent modification of BIOS settings;

executing, by the BIOS lockdown subsystem, first BIOS instructions to provide a BIOS and, in response to determining that the BIOS lockdown mode is set, ignoring a subset of the first BIOS instructions to access a BIOS settings modification subsystem; and executing, by the BIOS lockdown subsystem, second BIOS instructions to provide the BIOS and, in response to determining that the BIOS lockdown mode is set, ignoring a subset of the second BIOS instructions to access a BIOS authentication modification subsystem.

15. The method of claim 14, wherein the configuring the BIOS storage subsystem to prevent modification of the BIOS settings includes:

configuring, by the BIOS lockdown subsystem, BIOS setup options in the BIOS settings as read only.

16. The method of claim 14, wherein the configuring the BIOS storage subsystem to prevent modification of the BIOS settings includes:

disabling, by the BIOS lockdown subsystem, at least one write interface to BIOS attributes in the BIOS settings.

17. The method of claim 14, further comprising:

configuring, by the BIOS lockdown subsystem in response to determining that the BIOS lockdown mode is set, a BMC device that is coupled to the BIOS lockdown subsystem in a BMC lockdown mode.

18. The method of claim 17, further comprising:

configuring, by the BMC device in response to the BMC device being configured in the BMC lockdown mode, a BMC storage subsystem to prevent modification of BMC settings; and preventing, by the BMC device in response to the BMC device being configured in the BMC lockdown mode, a BMC device reset.

19. The method of claim 14, wherein the BIOS authentication modification subsystem is a first physical jumper subsystem, and wherein the BIOS setting modification subsystem is at least one of a second physical jumper subsystem and a BIOS battery.

20. The method of claim 14, further comprising:

setting, by the BIOS lockdown subsystem, the BIOS lockdown mode in response to one of:
- a command received from a management system via a network; or
- a command received from a personality module that is housed in the chassis.

* * * * *